(12) United States Patent
Bagheri

(10) Patent No.: US 10,979,779 B2
(45) Date of Patent: *Apr. 13, 2021

(54) INTERNET ENABLED VIDEO MEDIA CONTENT STREAM

(71) Applicant: AT&T Mobility II LLC, Atlanta, GA (US)

(72) Inventor: Manouchehr Bagheri, Northborough, MA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,351

(22) Filed: Jan. 3, 2020

(65) Prior Publication Data

US 2020/0145730 A1 May 7, 2020

Related U.S. Application Data

(63) Continuation of application No. 15/216,024, filed on Jul. 21, 2016, now Pat. No. 10,555,051.

(51) Int. Cl.
*H04N 21/858* (2011.01)
*H04N 21/2387* (2011.01)
(Continued)

(52) U.S. Cl.
CPC ..... *H04N 21/8126* (2013.01); *H04N 21/2387* (2013.01); *H04N 21/23424* (2013.01);
(Continued)

(58) Field of Classification Search
CPC ............. H04N 21/8126; H04N 21/858; H04N 21/812; H04N 21/47815; H04N 21/2387;
(Continued)

(56) References Cited

U.S. PATENT DOCUMENTS 5,929,849 A 7/1999 Kikinis et al.
6,282,713 B1 8/2001 Kitsukawa
(Continued)

FOREIGN PATENT DOCUMENTS

JP 2002540648 A 11/2002
WO 9712342 A1 4/1997
(Continued)

OTHER PUBLICATIONS

"International Search Report and Written Opinion for PCT/US18/062616", dated Feb. 14, 2019, 12 pages.
(Continued)

*Primary Examiner* — Nathan J Flynn
*Assistant Examiner* — Christine A Kurien
(74) *Attorney, Agent, or Firm* — Guntin & Gust, PLC; Jay Anderson

(57) ABSTRACT

Aspects of the subject disclosure may include, for example, a method that includes receiving weblink information, receiving media content, inserting the weblink information into a digital frame, providing the plurality of digital frames as a video stream to a consumer media device, displaying, by the consumer media device, the video stream, receiving, by the consumer media device, a user input to pause the video stream during the displaying of the video stream to pause the video stream to display a current digital frame of the plurality of digital frames, receiving, by the consumer media device, a user input indicating a selection of a portion of the current digital frame, determining selected Weblink information for the portion of the current digital frame, and providing a connection to a website associated with the selected Weblink information to the consumer media device. Other embodiments are disclosed.

20 Claims, 10 Drawing Sheets

(51) Int. Cl.
*H04N 21/81* (2011.01)
*H04N 21/478* (2011.01)
*H04N 21/234* (2011.01)
*H04N 21/45* (2011.01)

(52) U.S. Cl.
CPC ... *H04N 21/4524* (2013.01); *H04N 21/47815* (2013.01); *H04N 21/812* (2013.01); *H04N 21/858* (2013.01)

(58) Field of Classification Search
CPC ......... H04N 21/23424; H04N 21/4524; H04N 21/42224; H04N 21/41407; H04N 21/4333
See application file for complete search history.

(56) References Cited

U.S. PATENT DOCUMENTS

| | | |
|---|---|---|
| 6,483,986 B1 | 11/2002 | Krapf et al. |
| 7,017,173 B1 | 3/2006 | Jorgensen et al. |
| 7,158,676 B1 | 1/2007 | Rainsford et al. |
| 7,240,075 B1 | 7/2007 | Nemirofsky et al. |
| 7,735,101 B2 | 6/2010 | Lanza et al. |
| 7,899,705 B2 | 3/2011 | Fuisz et al. |
| 7,933,809 B2 | 4/2011 | Abraham et al. |
| 8,392,821 B2 | 3/2013 | DeMarco et al. |
| 8,667,539 B2 | 3/2014 | Hartson et al. |
| 8,843,959 B2 | 9/2014 | Isidore et al. |
| 8,922,578 B2 | 12/2014 | Hunleth et al. |
| 8,937,685 B1 | 1/2015 | Chiu et al. |
| 9,106,881 B2 | 8/2015 | Barton et al. |
| 9,173,010 B2 | 10/2015 | Sussman |
| 9,189,818 B2 | 11/2015 | McClements, IV et al. |
| 9,351,032 B2 | 5/2016 | Briggs et al. |
| 9,440,152 B2 | 9/2016 | Thompson et al. |
| 9,462,309 B2 | 10/2016 | Kaiser et al. |
| 9,635,438 B2 | 4/2017 | Mandalia et al. |
| 9,674,584 B2 | 6/2017 | Briggs et al. |
| 2001/0016835 A1 | 8/2001 | Hansmann et al. |
| 2002/0056109 A1 | 5/2002 | Tomsen et al. |
| 2002/0087969 A1 | 7/2002 | Brunheroto et al. |
| 2002/0112249 A1 | 8/2002 | Hendricks et al. |
| 2002/0129364 A1 | 9/2002 | Smith et al. |
| 2002/0184514 A1 | 12/2002 | Granzer |
| 2003/0135434 A1 | 7/2003 | Jain |
| 2003/0220835 A1 | 11/2003 | Barnes, Jr. et al. |
| 2005/0097622 A1 | 5/2005 | Zigmond et al. |
| 2005/0210526 A1 | 9/2005 | Levy et al. |
| 2009/0083815 A1 | 3/2009 | McMaster et al. |
| 2009/0193475 A1 | 7/2009 | Halverson et al. |
| 2009/0278986 A1 | 11/2009 | Ikegami |
| 2010/0161441 A1 | 6/2010 | Hounsell |
| 2011/0093879 A1 | 4/2011 | Salkind et al. |
| 2012/0253982 A1 | 10/2012 | Wright |
| 2013/0019261 A1 | 1/2013 | Huber et al. |
| 2013/0227622 A1 | 8/2013 | Landow et al. |
| 2013/0290847 A1 | 10/2013 | Hooven et al. |
| 2014/0281004 A1 | 9/2014 | Bridges |
| 2014/0372210 A1 | 12/2014 | Watfa et al. |
| 2015/0026718 A1 | 1/2015 | Seyller |
| 2015/0213476 A1 | 7/2015 | Foster et al. |
| 2015/0245103 A1 | 8/2015 | Conte |
| 2015/0262229 A1 | 9/2015 | Brenner et al. |
| 2016/0162979 A1 | 6/2016 | Robinson |
| 2016/0239907 A1 | 8/2016 | Dolen |
| 2017/0060823 A1 | 3/2017 | Zheng et al. |
| 2017/0308651 A1 | 10/2017 | Pattni |
| 2018/0027305 A1 | 1/2018 | Bagheri et al. |
| 2018/0150868 A1 | 5/2018 | Stone et al. |
| 2018/0232766 A1 | 8/2018 | Braunberger |
| 2019/0171884 A1 | 6/2019 | Bagheri |

FOREIGN PATENT DOCUMENTS

| | | |
|---|---|---|
| WO | 9847084 A1 | 10/1998 |
| WO | 1998047084 | 10/1998 |
| WO | 9900979 A1 | 1/1999 |
| WO | 9910822 A1 | 3/1999 |
| WO | 2001099325 | 12/2001 |

OTHER PUBLICATIONS

"Object-Based Media Group", MIT Media Lab, Jun. 18, 2016, 22 pages.

"XAPP ADS® Give Consumers a Voice", http://web.archive.org/web/20140423023115/http://xappmedia.com/, Discloses interactive audio ads that connect consumers directly with your brand by responding to ads instantly with just their voice, providing convenience for them and conversion for you., Apr. 23, 2014.

McCollin, Rachel, "Making Embedded Content Work in Responsive Design", https://www.smashingmagazine.com/2014/02/making-embedded-content-work-in-responsive-design/, Discloses how to make embedded content responsive using CSS., Feb. 27, 2014.

Mitchell, Perry, "Interacting with overlay elements on mobile HTML5 video", http://perrymitchell.net/article/interacting-with-overlay-elements-on-html5-video/, Discloses using an overlay poster to allow the placement of ads and other objects on top of the video poster., Nov. 19, 2013.

Novy, Dan, "4K/8K Comics", http://web.archive.org/web/20160427032713/http://obm.media.mit.edu/, Discloses the comic panel becoming the entry point to the corresponding moment in the film adaptation, while scenes from the film indicate the source frames of the graphic novel (p. 10)., Apr. 27, 2016.

Wales, Tim, "Captivating Open University students with online literature search tutorials created using screen capture software", http://www.emeraldinsight.com/doi/abs/10.1108/00330330810912052, Discloses the use of screen capture software for information literacy purposes in a UK academic library and distance-learning context., 2008.

100

INTERNET ENABLED VIDEO MEDIA CONTENT STREAM

CROSS-REFERENCE TO RELATED APPLICATIONS

This application is a continuation of U.S. patent application Ser. No. 15/216,024, filed on Jul. 21, 2016. All sections of the aforementioned application are incorporated herein by reference in their entirety.

FIELD OF THE DISCLOSURE

The subject disclosure relates to a system and method for providing media content with Internet enabled content.

BACKGROUND

Media content is provided to customers via a broadcast source separately from Internet accessed content.

BRIEF DESCRIPTION OF THE DRAWINGS

Reference will now be made to the accompanying drawings, which are not necessarily drawn to scale, and wherein.

DETAILED DESCRIPTION

Figure 1:
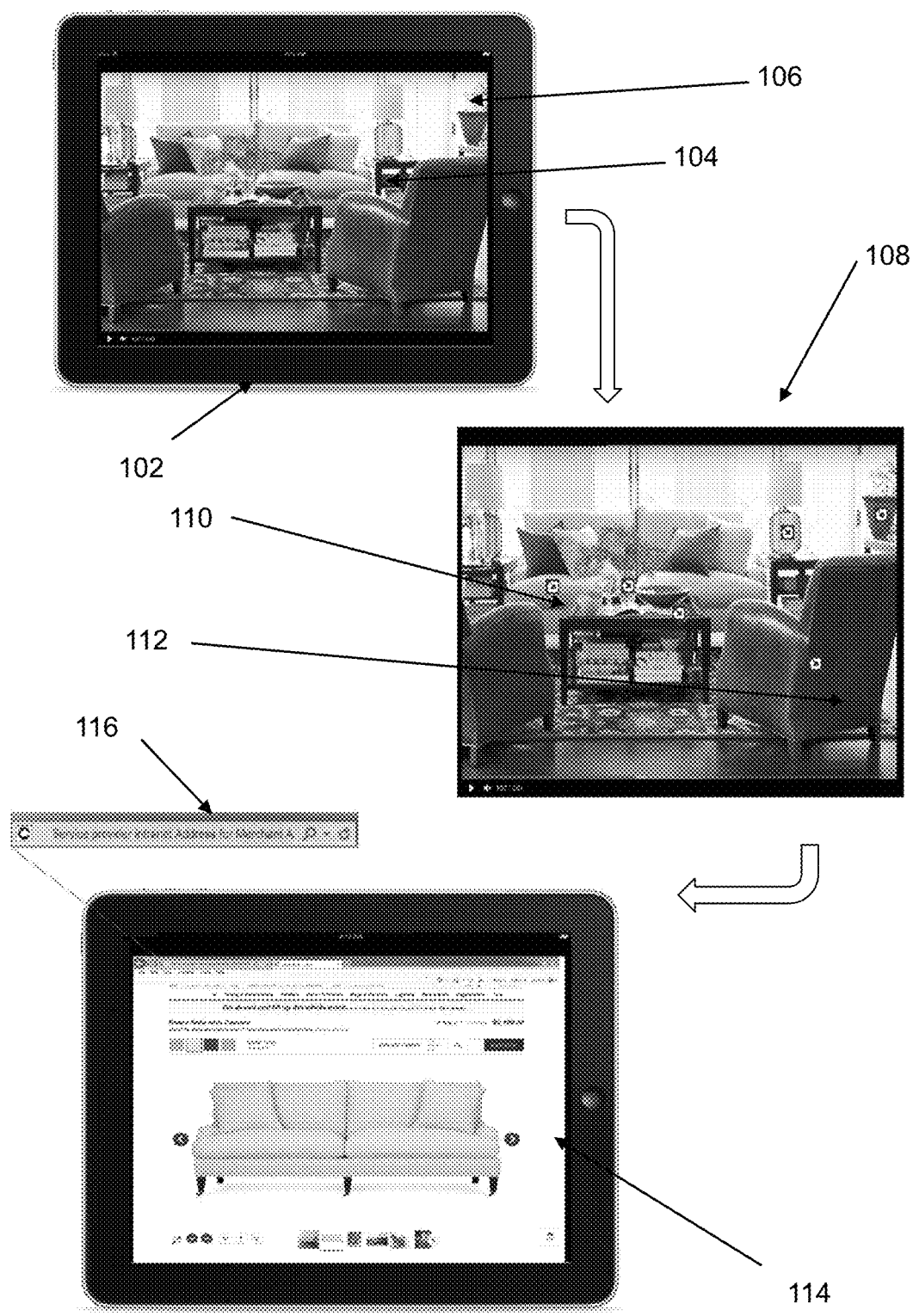
FIG. 1 depicts an illustrative embodiment of system 100 for a Video Internet System.

The subject disclosure describes, among other things, illustrative embodiments for providing media content with Internet links provided in digital frames of a video stream of the media content. Other embodiments are described in the subject disclosure.

One or more aspects of the subject disclosure include a method that includes receiving, by a processing system comprising a processor, product website information, receiving, by the processing system, media content, wherein the media content comprises a plurality of digital frames, inserting, by the processing system, the product website information into a digital frame of the plurality of digital frames that includes an object related to the product website information, providing, by the processing system, the plurality of digital frames as a video stream to a consumer media device, displaying, by the consumer media device, the video stream, receiving, by the consumer media device, a user input to pause the video stream during the displaying of the video stream to pause the video stream to display a current digital frame of the plurality of digital frames, receiving, by the consumer media device, a user input indicating a selection of a portion of the current digital frame, wherein the portion of the current digital frame indicates the object related to the product website information, determining, by the processing system, selected product website information for the portion of the current digital frame, and providing, by the processing system, a connection to a website associated with the selected product website information to the consumer media device.

One or more aspects of the subject disclosure include machine-readable storage medium, including executable instructions that, when executed by a processing system including a processor, facilitate performance of operations that include receiving media content, wherein the media content comprises a plurality of digital frames, receiving an access information database including a plurality of item categories, a plurality of objects, and plurality of webpage links, performing a first search of the plurality of digital frames to determine if an object in the digital frame matches an item category of the plurality of item categories, displaying the media content, receiving a command to pause the media content during the displaying of the media content to pause the media content to display a current digital frame of the plurality of digital frames, performing a second search of the current digital frame to determine if an object in the current digital frame matches an object of the plurality of objects as a matching object, retrieving webpage links for the object from the plurality of webpage links from the database, inserting the webpage links into the current digital frame at the matching object, receiving an input indicating a selection of a portion of the current digital frame, and providing a connection to a website associated with the webpage link via an intranet.

One or more aspects of the subject disclosure include an apparatus that includes a processing system including a processor and a memory that stores executable instructions that, when executed by the processing system, facilitate performance of operations, including providing media content to a media processor, wherein the media content comprises a plurality of digital frames, providing a website link database to the media processor, wherein the website link database includes website information for selected objects that appear in the plurality of digital frames, wherein the media processor adds website links to the selected objects in a digital frame of the plurality of digital frames responsive to receiving a pause command, receiving an indication of a selection of one the selected objects in the digital frame as a selected webpage from the media processor, and providing a secure connection to the selected webpage to the media processor, wherein the media processor opens a web browser window to present the selected webpage.

FIG. 1 depicts an illustrative embodiment of a video Internet system, or Vnet system, 100. FIG. 1 illustrates a mobile computing device 102 on which a streaming or broadcast video stream 104 is displayed on a screen 106 of the mobile computing device 102.

Figure 11:
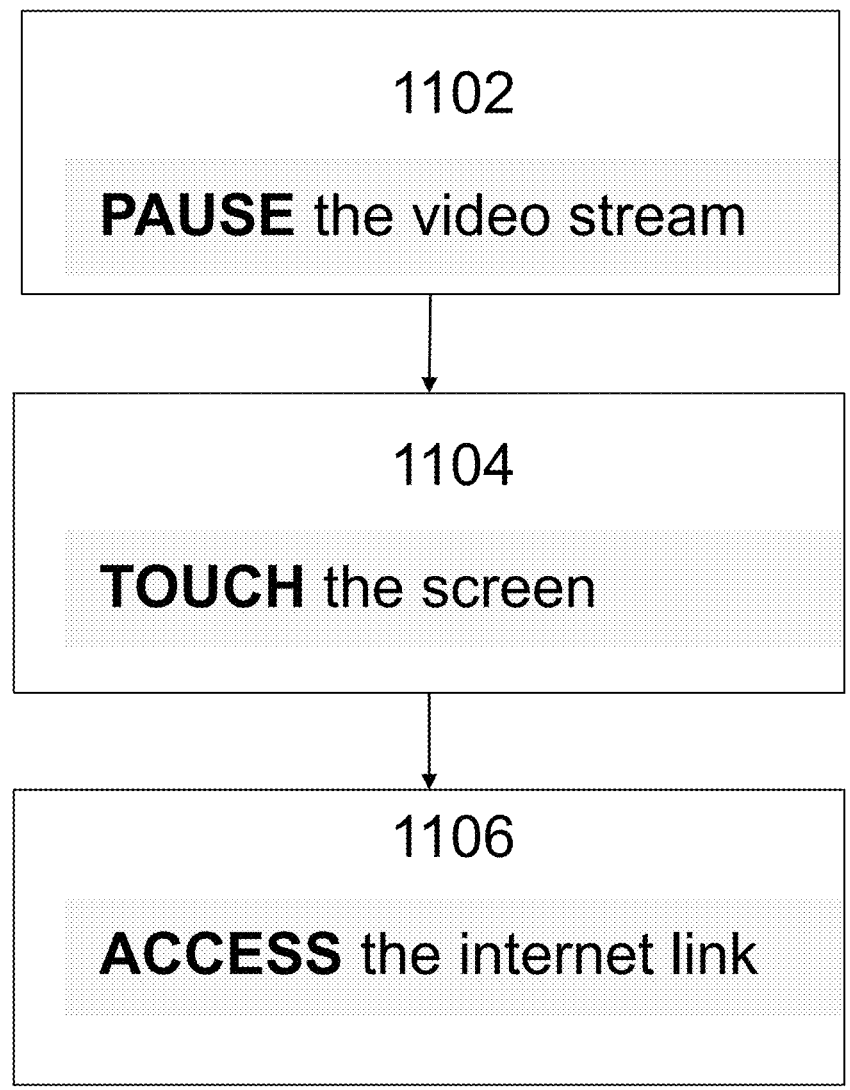
FIG. 11 depicts an additional illustrative embodiment of a method 1100 used in portions of the system 100 described in FIG. 1.

Additionally, FIG. 11 depicts an exemplary method 1100 that can be used in portions of Vnet system 100 in FIG. 1. Method 1100 describes exemplary steps for receiving webpages from media content. Exemplarily, in step 1102, a video stream is paused. The video stream can include internet links contained within the paused image. Each frame of a TV show or advertisement can contain a link to an address on the Internet. In advanced cases multiple spot of each frame can be allocated to different accessible Internet links.

Once paused, in step 1104, the links within the paused image can be accessed. In other embodiments, step 1102 can be eliminated so that unpaused video having Internet links can be accessed. In some embodiments, the images can be access via a cursor or other pointer device. In other embodiments, a touch sensitive screen can be utilized to allow the user to touch the image on the screen. In yet other embodiments, a voice command can be used.

Returning to FIG. 1, as illustrated in screen shot 108, a paused image is provided with Internet links based on a location on the screen 106. Exemplarily, objects in the screen shot are provided with customized Internet links. These links would link to websites that exemplary provide more information or shopping opportunities. Thus, in the example of FIG. 1, screen shot 108 includes object based links 110 and 112. Exemplarily, object based links 110 and 112 are provided for different objects on the screen shot 108.

Returning to FIG. 11, in step 1106, a selected link can be accessed. The responsive spots can be allocated to related web pages on the internet that can be used for commercial purposes like online ordering or further searches related to the media content.

Exemplarily, the related webpages are opened in a window. In addition, the related webpages can provide a secure environment for any order being placed through a website maintained by a merchant because the webpage is presented and controlled by the service provider that provides the media content. Exemplarily, the content provider and the user already have a preexisting contractual arrangement. Accordingly, the service provider can ensure the user and the merchant connect in a secure environment because a whole end-to-end connectivity is provided by the content provider. Exemplarily, the content provider can maintain the user's financial information to conduct payment arrangements with the merchant, thus ensuring a very secure transaction.

Exemplarily, if the user accessing the webpage of a merchant that has a service agreement with the same network provider as the Vnet system, the connection to the webpage can be initiated via an intranet that is secured by the content provider. In other embodiments, a situation can arise where the webpage is provided by a merchant that is outside the content provider's intranet. In this instance, the content provider can still check the webpage security and credentials before providing the user access to the webpage. Accordingly, the user can experience a higher level of Internet security than if the user had accessed the webpage through other means, such as simply typing the name of the product into a search engine. In other embodiments, the product provider may not be a direct customer of the service provider. In some instances, a public network may be used. In order to ensure the security of the users, the communication between the product provider and user should is exemplarily routed through a firewall that is established and maintained by the Vnet system.

Returning to Vnet system 100 of FIG. 1, in an example in which object based link 110 was selected, webpage 114 has been provided in a new window on the mobile computing device 102. Exemplarily, the user can access webpage 114 to peruse and possibly purchase the item, in this case the white couch in screen shot 108 that was associated with the object based link. As illustrated in highlight 116 of webpage 114, the webpage can be accessed via an intranet created between the merchant and the service provider.

Figure 2:
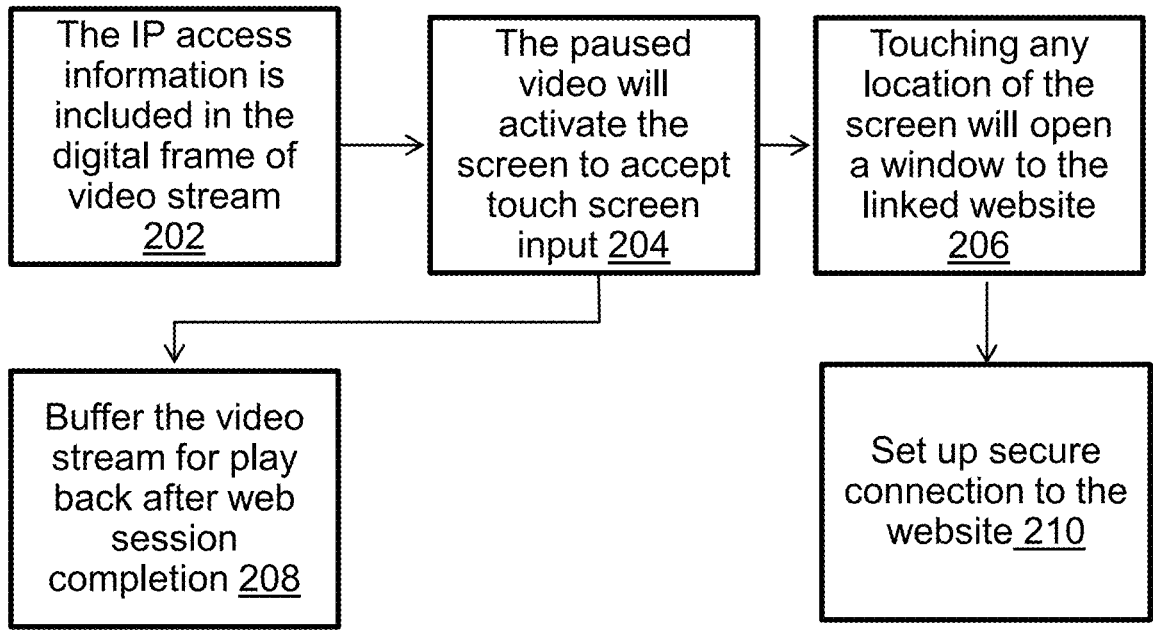
FIG. 2 depicts an illustrative embodiment of method 200 used in portions of the system 100 described in FIG. 1.

FIG. 2 depicts an illustrative embodiment of method 200 used in the Vnet system 100 described in FIG. 1. Exemplarily, method 200 starts with Internet Protocol access information being included in a digital frame in a video stream in step 202. The Internet Protocol access information, which can also be referred to as website product information, can exemplarily be added by the content provider before broadcasting or streaming the media content. Exemplarily, the video stream provided by a service provider includes a plurality of digital frames that makes up the media content provided by the content provider. Exemplarily, images in the digital frame will have webpage addresses assigned to them. For example, images of products in an advertisement would include links to webpages associated with the product. In step 202, the service provider exemplarily streams or broadcasts the media content. In addition, the media content is exemplarily displayed at a user media device.

Next, in step 204, while the media content is being presented on the user media device, the user media device will, responsive to receiving an input indicating a pause command, pause the video. In addition, during the pause of the media content, the video stream can be buffered as exemplarily illustrated in step 208.

Once paused, a digital frame of the media content is displayed on the user media device and the webpage links included in the paused digital frame can become active. Next, in step 206, a user input indicating a selection of a portion of the screen will open a window to a webpage according to the webpage link. In addition, as illustrated in step 210 a secure connection is established with the webpage.

Figure 3:
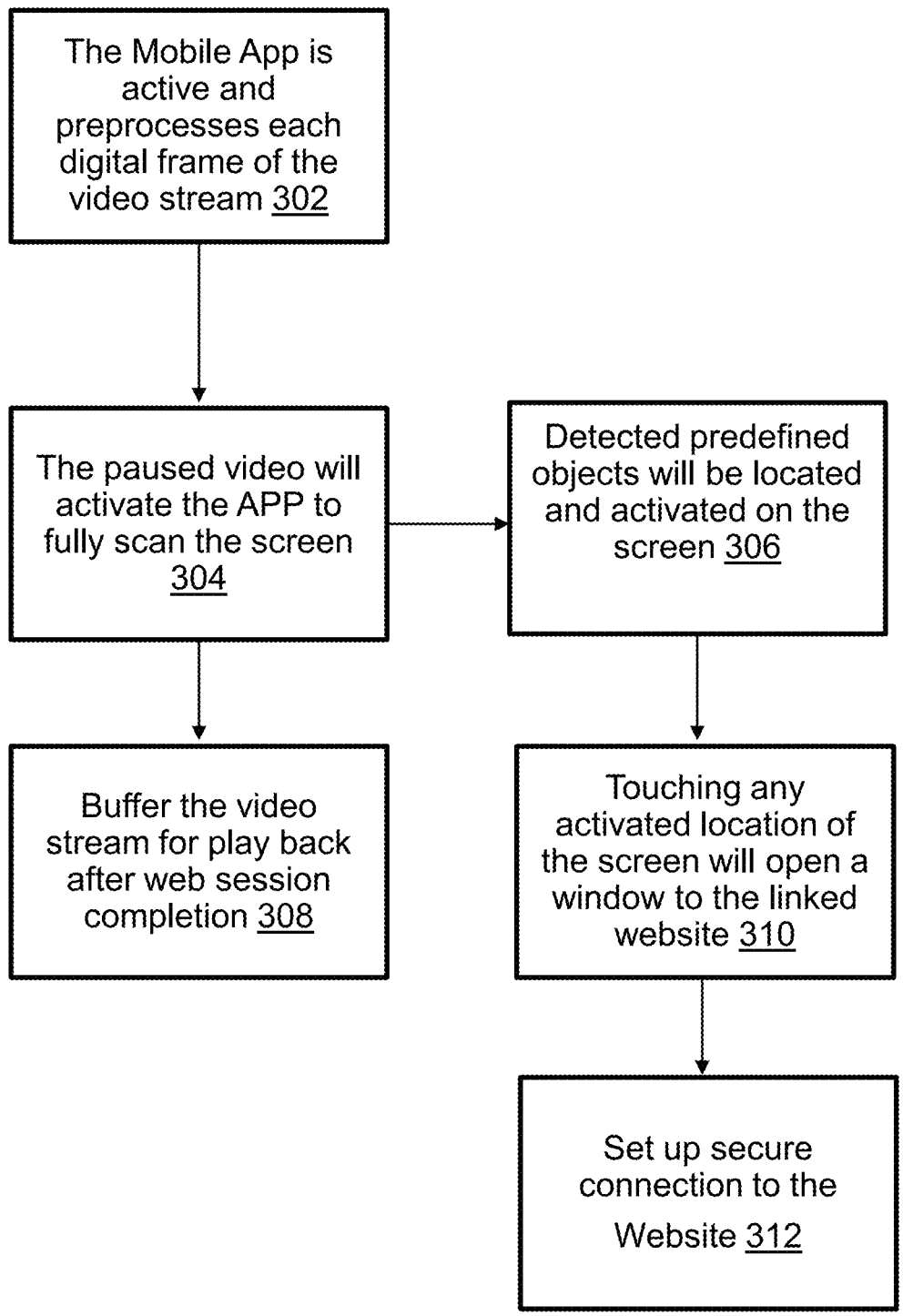
FIG. 3 depicts an additional illustrative embodiment of a method 300 used in portions of the system 100 described in FIG. 1.

FIG. 3 depicts an illustrative embodiment of a method 300 used by exemplary embodiments of the Vnet system 100 of FIG. 1. In method 300, the video stream can exemplarily be received and presented by a mobile device that includes a mobile application, or mobile app. The mobile application can be referred to as a Vnet application or Vnet app. Exemplarily, the mobile application can insert the Internet Protocol access information, which can also be referred to as product webpage information, for the video stream instead of the content provider directly providing the Internet Protocol access information within the media content. In step 302, the mobile application receives and preprocesses each digital frame of the video stream. Exemplarily, the Vnet application has received a database of Internet Protocol access information. The Internet Protocol access information database can include image information and the related webpage links for those images. The product webpage information database can exemplarily be organized by merchant, manufacturer, product type, among other categories. Exemplarily, the mobile application searches each digital frame for images related to known categories in the preprocessing stage. In other embodiments, the database can be accessed via a cloud-based connection to the relevant information.

Exemplarily, the Internet Protocol access information database can be referred to as an access information database. The access information database can include multiple sub-databases that are arranged according to categories. The access information database can be organized according to a merchant's information so that when an object for that merchant is found within the media content, that merchant's particular database can be preloaded. For example, if the media content currently includes a commercial advertisement being displayed, then the merchant associated with that commercial advertisement can be preloaded. In another embodiment, the access information database can include categories for types of products. Referring to FIG. 1, for example, the media content scene can include a variety of furniture. If the preprocessing recognizes furniture in a scene being displayed, a sub-database including a variety of webpage links for furniture can be accessed. Accordingly, in the example of FIG. 1, once the scene is paused, the furniture database can be readily loaded to find webpage links for the furniture 110 and 112. Next, the webpage 114 for object 110, here a sofa, can be accessed, once selected, based on the webpage information associated with that object included in the access information database.

Returning to FIG. 3, preprocessing exemplarily includes recognizing, for media content that includes commercial content, the commercial provider's identity and a related product database. Accordingly, each frame of the commercial can be prepared for further searches. For example, depending on the commercial prover's identity, different categories of the provider's products can be accessed. In addition, knowing this information ahead of time can provide instant access the relevant, particular sections of a database and make a connectivity process nearly instant after receiving a pause and a final selection.

In addition, the preprocessing can identify items that may be related to other business agreements or image filters that the media content provider has arranged with other businesses. In one example, the mobile application would search the image for any vehicle to identify a car manufacturer that the media content provider has an advertising contract with.

Next, in step 304, responsive to a pause in the video, a more intense search of the image for objects can take place. Exemplarily, the search can be more intense because a processor has more time to fully analyze the image for relevant content. Thus, while preprocessing exemplarily allows the system to recognize categorical and general sections of each digital frame and, as soon as paused, the image search performed while pause can add more detailed connectivity options to each category or additional products in the first recognized picture. For example if the primary picture was a table, after the pause, the system may start identifying all objects on the table such as lamps, or vases, if these items are provided by same merchant or business entity.

In addition, the second search while paused can also determine websites of similar products to give more options to the customer if desired. Accordingly, another search of the image can be performed after pausing the image to find additional items to provide with website links. In other embodiments, the preprocessing steps can be eliminated and only the post-pause search of the image can be carried out.

Next, in step 306, links to websites can be added to the objects. Exemplarily, these links are related to the objects on the screen as found during either one of the first, preprocessing search or during the second, more intense search. Exemplarily, the links can be for websites through which a purchase can be made or through which more information about the product can be found. Additionally, in step 308, the paused media content video stream can be buffered. In some embodiments, the second, more intensive search can be performed during the pause.

Next in step 310, an input indicating a selection of an object in the digital frame can be received. Exemplarily, this input includes a touch on or near the object on the display at which the digital frame is displayed. In other embodiments, other selection methods can be employed, such as through a vocal interaction with the media device.

Once the object is selected, a secure connection the website can be established in step 312. Exemplarily, the secure connection can be embodied in a webpage opened on the media device through an intranet with the service provider so as to ensure that the website is between the customer or user and the merchant or business associated with the selected object.

Figure 4:
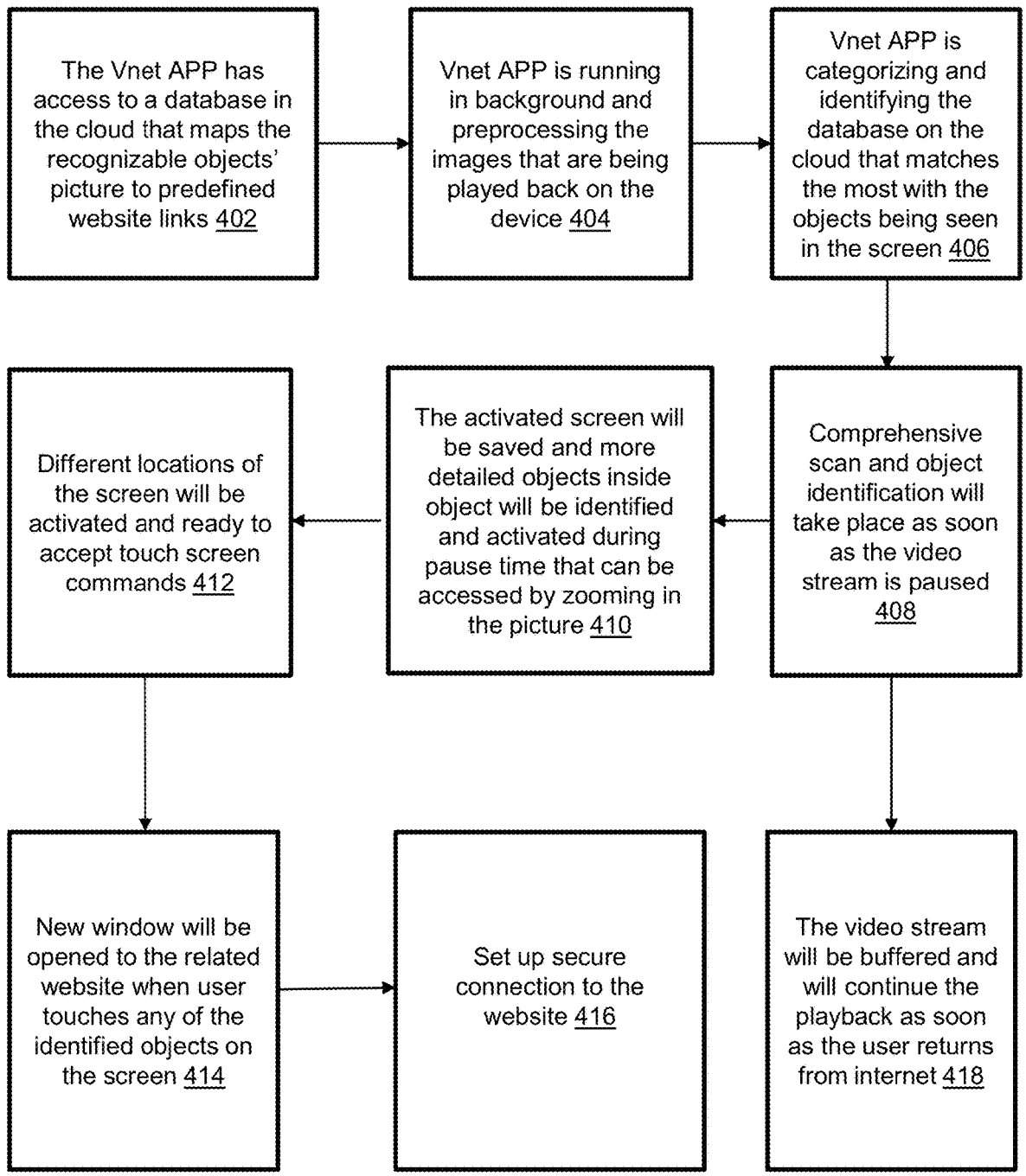
FIG. 4 depicts an additional illustrative embodiment of a method 400 used in portions of the system 100 described in FIG. 1.

FIG. 4 illustrates another exemplary embodiment in method 400 used in the Vnet system 100 described in FIG. 1. While similar to the embodiment illustrated in FIG. 3, FIG. 4 can also include step 402 in which a database of recognizable objects with predefined website links is provided. Various databases can be provided. These various databases can be provided based on the type of advertisement or merchant, the type of product, type of service, as well as definitions of objects, such as images of actors, products, or buildings to be associated with a website link.

Step 404 illustrates that a Vnet application, as being executed on a mobile media device, for example, can operate in the background during a presentation of media content. Step 406 illustrates that the application identifies and categorizes objects in the digital frame and then chooses a database that matches the scene. Thus, for example, the application could determine that a food product database is most appropriate for a scene while another scene may indicate an automotive database. During step 406, the first, preprocessing search of the image can be performed along with determining the relevant database.

Similar to other embodiments, once paused, in step 408, a second, more intense search of the image for objects to provide website links to can be performed. In addition, as illustrated in step 418, the video stream can be buffered and restarted once the user closes the webpage. Next, in step 410, the digital frame that is displayed while paused can be saved. Additionally, the user may be presented with an option to zoom in on an object or zoom out from an object to assist in selection of the object. Thus, in step 412, different areas of the display can be ready to receive, for example, a touch command Once an object is selected, a new, secure window can be opened to the website related to the object in step 414. Additionally, in step 416, a secure connection to the website can be established in the window.

Figure 5:
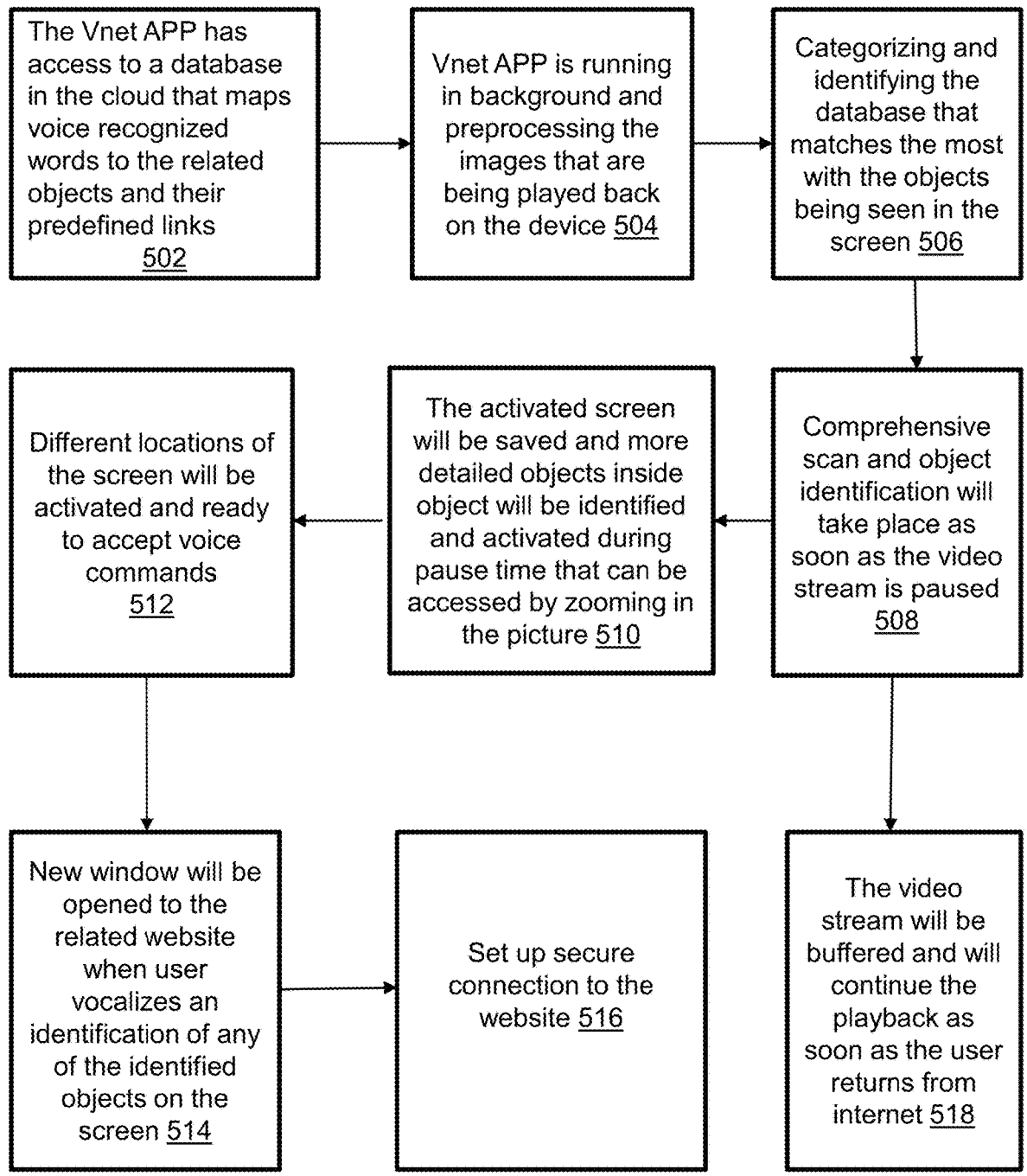
FIG. 5 depicts an additional illustrative embodiment of a method 500 used in portions of the system 100 described in FIG. 1.

FIG. 5 illustrates another exemplary embodiment of a method 500 used in the Vnet system 100 described in FIG. 1 in which a Vnet application uses voice recognized words to access websites associated with an image. Similar to method 400, method 500 can be provided with a database in step 502. This database can exemplarily include voice recognizable words that can be mapped to objects on the screen and matched with various webpage links.

Step 504 illustrates that a Vnet application, as being executed on a mobile media device, for example, can operate in the background during a presentation of media content. In this embodiment, the mobile media device can include a microphone to listen for voice commands from the user. Step 506 illustrates that the application identifies and categorizes objects in the digital frame and then chooses a database that matches the scene. Thus, for example, the application could determine that a food product database is most appropriate for a scene while another scene may indicate an automotive database. During step 506, the first, preprocessing search of the image can be performed along with determining the relevant database. During these steps, voice commands that match the images from the database can also be determined.

Similar to other embodiments, once paused, in step 508, a second, more intense search of the image for objects can be performed. In addition, voice commands can also be determined based on the second search. In addition, as illustrated in step 518, the video stream can be buffered while the user is viewing the webpage. Next, in step 510, the digital frame that is displayed while paused can be saved. Additionally, the user may be presented with an option to zoom in on an object or zoom out from an object to assist in selection of the object. In addition, vocal commands to manipulate the image can be provided. Accordingly, if a zoom command is vocalized, the Vnet app would change the image as instructed. Thus, in step 512, the mobile media device can be prepared to receive a voice command that indicates a selection of the image in the digital frame. Once an object is selected, whether through a voice command or a simple touch command, a new, secure window can be opened to the website related to the object in step 514. Additionally, in step 516, a secure connection to the website can be established in the window.

Figure 6:
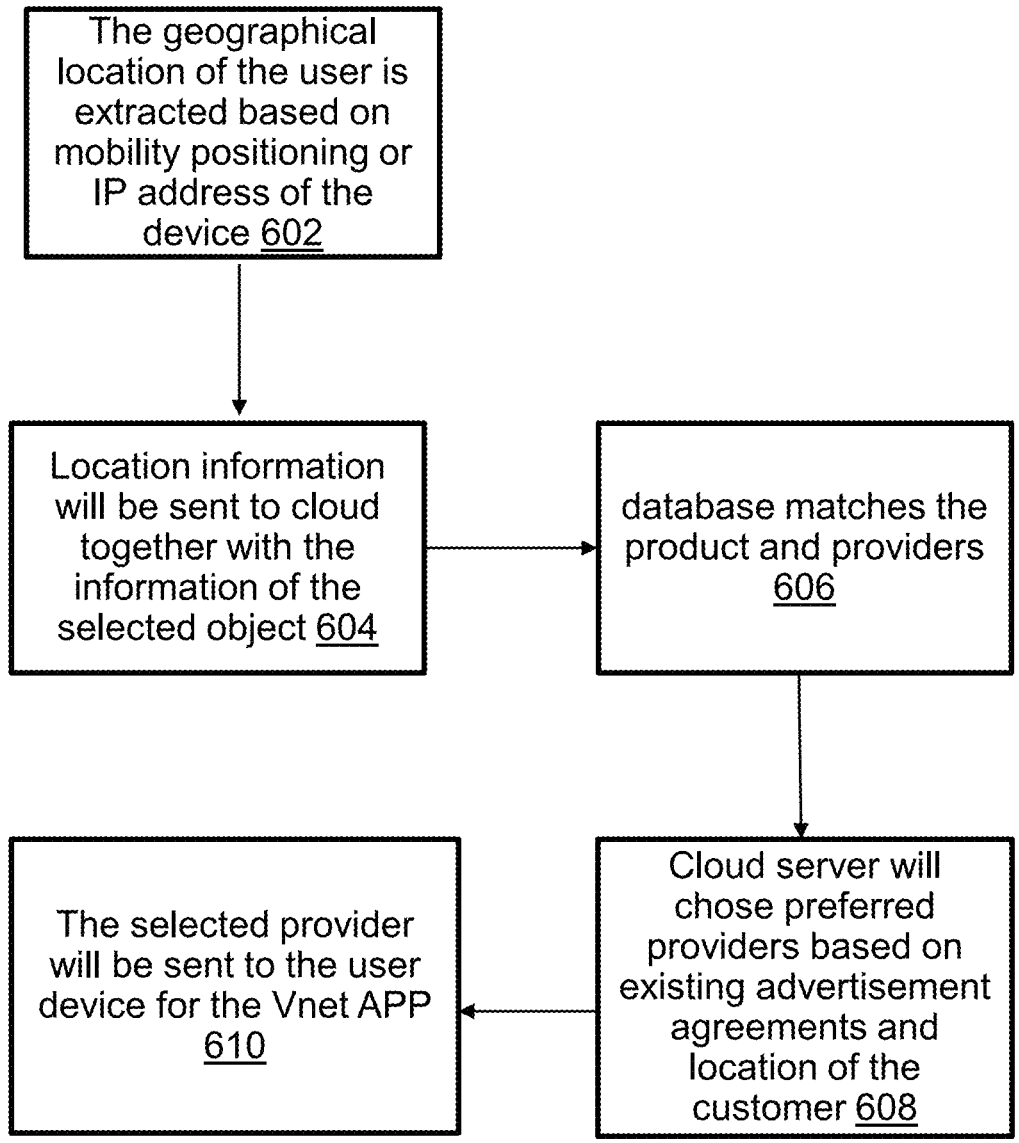
FIG. 6 depicts an additional illustrative embodiment of a method 600 used in portions of the system 100 described in FIG. 1.

FIG. 6 depicts an illustrative embodiment of method 600 that can be used in any of the previously described methods 200 thru 500 before or during different steps of the image processing. In the Vnet system 100 described in FIG. 1, a Vnet application can use location information for the user to determine website links to be added to objects in a digital frame of a media stream. Method 600 can begin at step 602 in which the geographic location of the user is determined. The geographic location can be determined based on various position determining methods such as location recognition procedures of mobility systems or IP based networking techniques. In other embodiments, the IP address of the media device can be used to ascertain the position. Exemplarily, the location information can be a location relevant to advertisers and merchants that advertise through the content provider.

In step 604, the location information can be combined with other information, such as from the preprocessing and intense processing searches as exemplarily defined in method 400 of FIG. 4, for example. Thus, the database that is accessed in step 402, for example, may also include location based webpage links. Accordingly, in step 606, for example, the match between the website links, including the location information, can be used to identify website links for the identified images in the digital frame. Exemplarily, in step 608, preferred providers of the merchandise or advertisements can be selected based on existing advertising agreements between Vnet service providers, product providers based on a proximity of the providers to the user's locaton. Next, in step 610, the relevant information will be provided to the Vnet application as illustrated in the preceding embodiments.

While for purposes of simplicity of explanation, the respective processes are shown and described as a series of blocks in FIGS. 2-6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
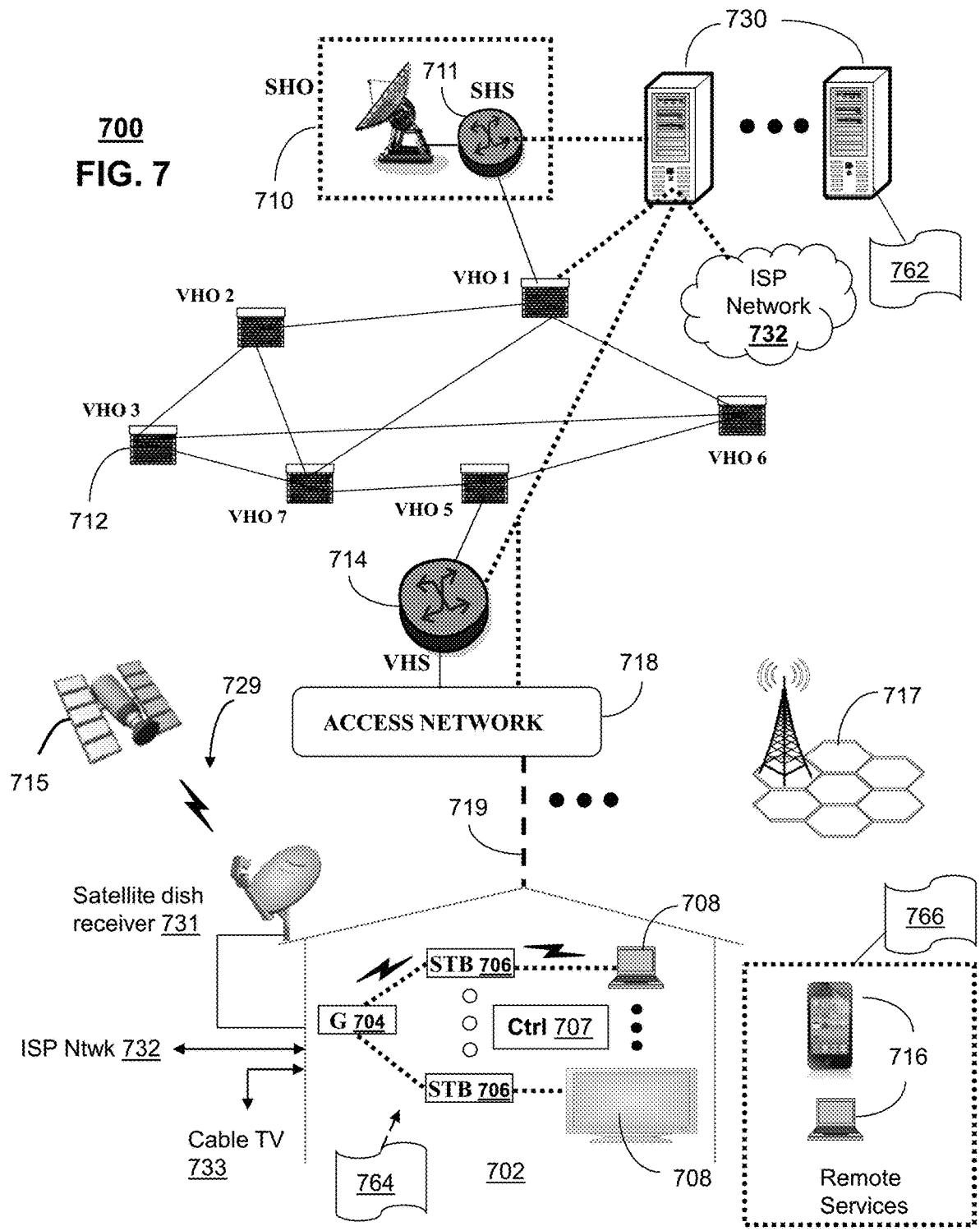
FIG. 7 depicts an illustrative embodiments of a communication system that provide media services to systems employing system 100 of FIG. 1 and methods 200-600 of FIGS. 2-6.

FIG. 7 depicts an illustrative embodiment of a first communication system 700 for delivering media content. The communication system 700 can represent an Internet Protocol Television (IPTV) media system. Communication system 700 can be overlaid or operably coupled with the Vnet system 100 of FIG. 1 as a representative embodiment of a communication system 700. For instance, one or more devices illustrated in the communication system 700 of FIG. 7 can perform a method that includes receiving, by a processing system comprising a processor, product website information, receiving, by the processing system, media content, wherein the media content comprises a plurality of digital frames, inserting, by the processing system, the product website information into a digital frame of the plurality of digital frames that includes an object related to the product website information, providing, by the processing system, the plurality of digital frames as a video stream to a consumer media device, displaying, by the consumer media device, the video stream, receiving, by the consumer media device, a user input to pause the video stream during the displaying of the video stream to pause the video stream to display a current digital frame of the plurality of digital frames, receiving, by the consumer media device, a user input indicating a selection of a portion of the current digital frame, wherein the portion of the current digital frame indicates the object related to the product website information, determining, by the processing system, selected product website information for the portion of the current digital frame, and providing, by the processing system, a connection to a website associated with the selected product website information to the consumer media device.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a Vnet content provider (herein referred to as Vnet content provider 730). The Vnet content provider 730 can use computing and communication technology to perform function 762, which can include among other things, providing an intranet enabled webpage via a secure connection as described, for example, by method 200 of FIG. 2. Alternatively, function 762 of Vnet content provider 730 can be similar to the functions of accessing databases to recognize objects in a digital frame of step 402 in FIG. 4. The media processors 706 and wireless communication devices 716 can be provisioned with software functions 764 and 766, respectively, to utilize the services of transformation key provider 730. For instance, functions 764 and 444 of media processors 706 and wireless communication devices 716 can be similar to the functions described as including IP Access information in a digital frame of a video stream in step 202 of method 200 of FIG. 2 and locating and activating detected predefined objects on the screen in step 306 of method 300 of FIG. 3.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
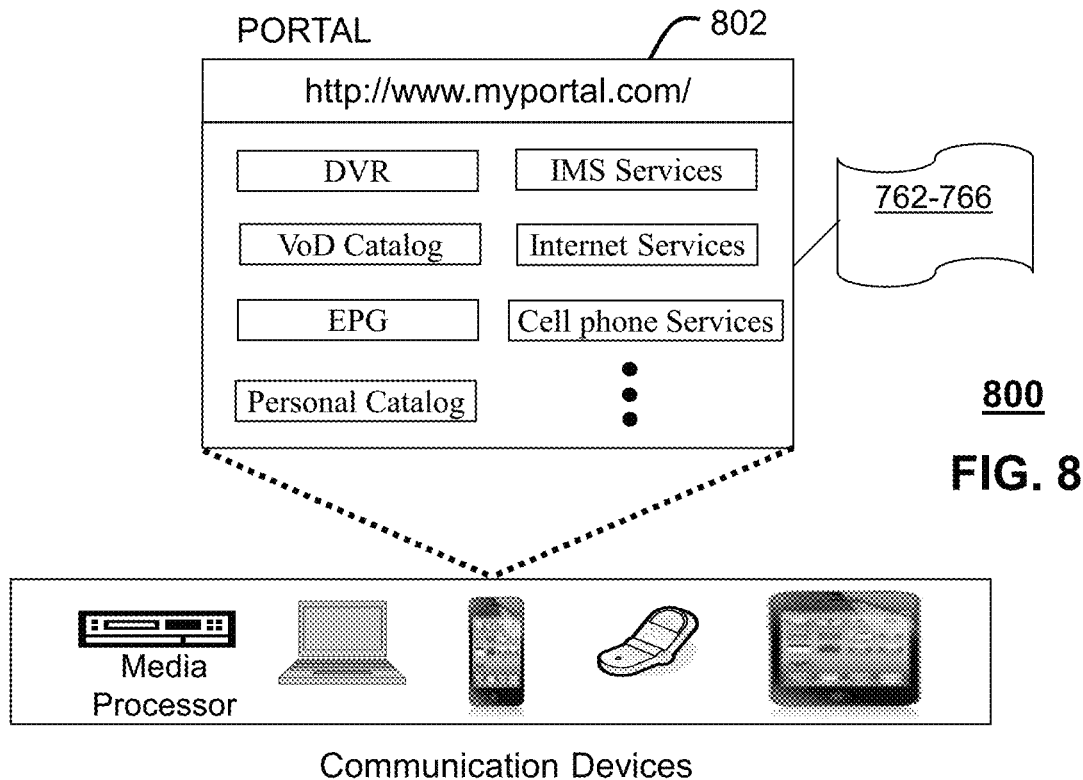
FIG. 8 depicts an illustrative embodiment of a web portal for interacting with the communication systems of with the system 100 of FIG. 1 and methods 200, 300, 400, 500, 600, and 1100 of FIGS. 2-6 and 11.

FIG. 8 depicts an illustrative embodiment of a web portal 802 of a communication system 800. Communication system 800 can be overlaid or operably coupled with Vnet system 100 of FIG. 1 and communication system 700 of FIG. 7 as another representative embodiment of systems Vnet system 100 of FIG. 1 and communication system 700 of FIG. 7. The web portal 802 can be used for managing services of Vnet system 100 of FIG. 1 and communication system 700 of FIG. 7. A web page of the web portal 802 can be accessed by a Uniform Resource Locator (URL) with an Internet browser using an Internet-capable communication device such as those described in Vnet system 100 of FIG. 1 and communication system 700 of FIG. 7. The web portal 802 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 802 can also be used for provisioning IMS services described earlier, provisioning Internet services, provisioning cellular phone services, and so on.

The web portal 802 can further be utilized to manage and provision software applications 762, 764, and 766 to adapt these applications as may be desired by subscribers and/or service providers of Vnet system 100 of FIG. 1 and communication system 700 of FIG. 7. For instance, a user can log into their on-line accounts and provision Vnet content provider 730 with the databases and weblink information of objects in the video stream and so on. Service providers can log onto an administrator account to provision, monitor and/or maintain the Vnet system 100 of FIG. 1 and communication system 700 of FIG. 7.

Figure 9:
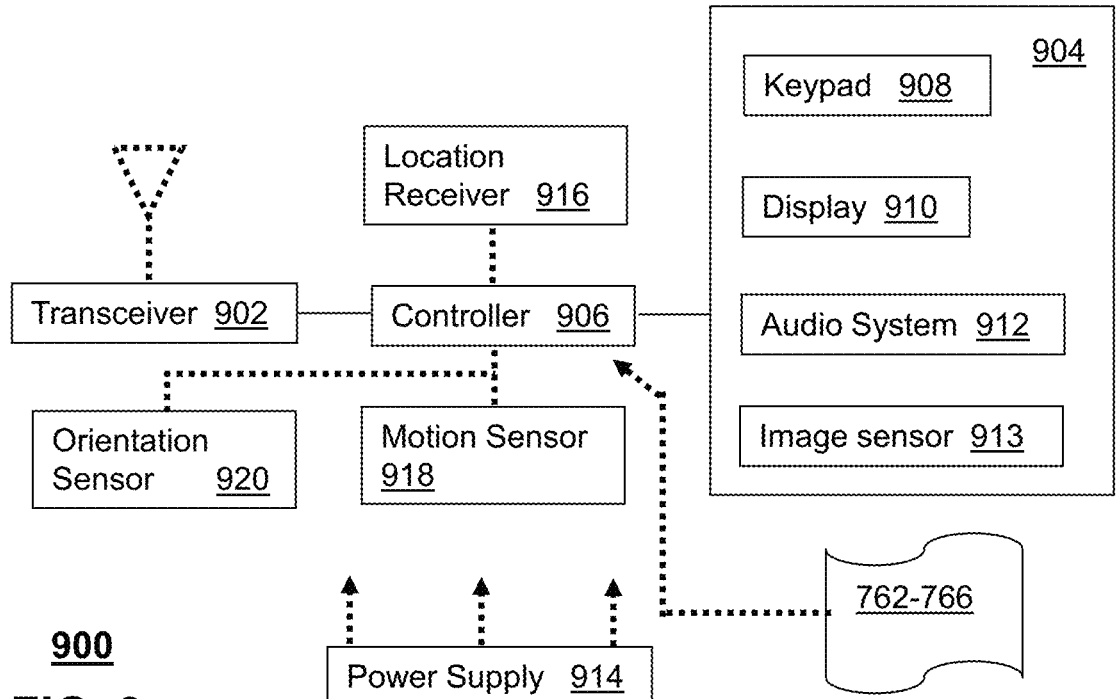
FIG. 9 depicts an illustrative embodiment of a communication device.

FIG. 9 depicts an illustrative embodiment of a communication device 900. Communication device 900 can serve in whole or in part as an illustrative embodiment of the devices depicted in Vnet system 100, such as mobile computing device 102, of FIG. 1 and communication system 700 of FIG. 7 and can be configured to perform portions of methods 200, 300, 400, 500, 600, and 1100 of FIGS. 2-6 and 11.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, 5G, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of Vnet system 100 of FIG. 1 and communication system 700, the media processor 706, the media devices 708, or the portable communication devices 716 of FIG. 7. It will be appreciated that the communication device 900 can also represent other devices that can operate in Vnet system 100 of FIG. 1 and communication system 700 of FIG. 7 such as a gaming console and a media player. In addition, the controller 906 can be adapted in various embodiments to perform the functions 762, 764, and 766, respectively.

Upon reviewing the aforementioned embodiments, it would be evident to an artisan with ordinary skill in the art that said embodiments can be modified, reduced, or enhanced without departing from the scope of the claims described below. For example, more advanced password options, such as voice and/or visual passwords can be transformed into unique high strength passwords.

In one embodiment, a user can select a per-website transformation key. In another embodiment, the selected key provides for the same transformation being applied to an easy-to-remember password. In one embodiment, the easy to remember password is selected of a particular length of characters based on a probability of disabling the keyboard (based on failed attempts) prior to a hacker being able to guess the password. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
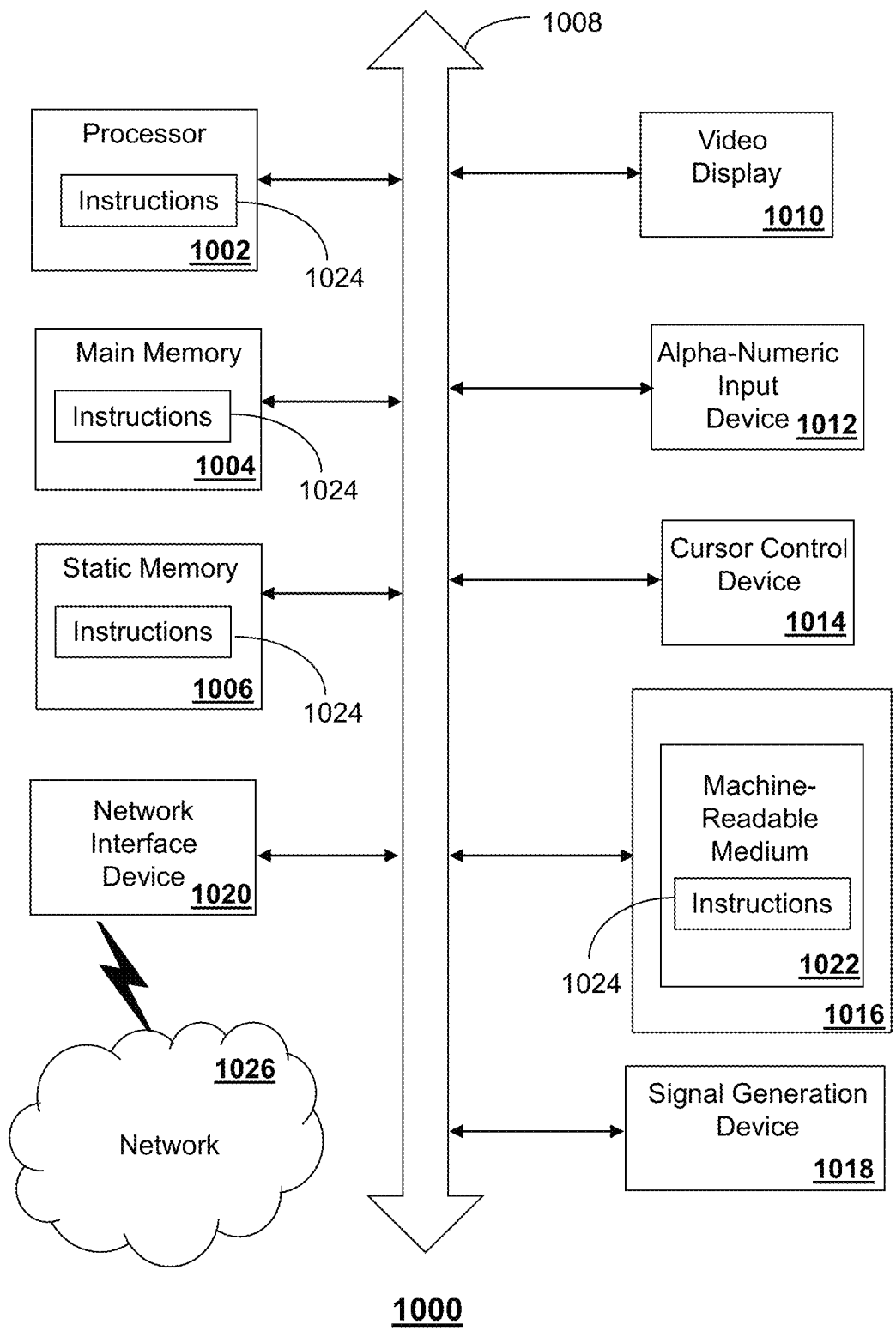
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the Vnet content provider 730 and the media processor 706 of FIG. 7, and the mobile computing device 102 of system 100 in FIG. 1. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a display device, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 10010. The computer system 1000 may further include a display unit 1010 (e.g., a liquid crystal display (LCD), a flat panel, or a solid state display). The computer system 1000 may include an input device 1012 (e.g., a keyboard or touch screen), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
providing, by a processing system comprising a processor, instructions to a media device to insert a first portion of product website information into a frame of a plurality of frames of a video stream, the frame including a primary object that is sold by a merchant;
receiving, by the processing system, an indication of a first user-generated input to pause a presentation of the video stream, wherein the media device pauses the presentation of the video stream to display the frame responsive to the first user-generated input;
providing, by the processing system and while the presentation of the video stream has been paused, instructions to the media device to insert a second portion of the product website information into the frame for a second object that is sold by the merchant;
receiving, by the processing system, an indication of a second user-generated input indicating a selection of the primary object or the second object in the frame;
responsive to selection of the primary object or the second object, determining, by the processing system, selected product website information from the first portion or the second portion of the product website information, wherein access to a website associated with the merchant and the selected product website information is only active after the pausing of the presentation of the video stream; and providing, by the processing system, a connection to the website and the selected product website information to the media device.

2. The method of claim 1, further comprising buffering the video stream during the pausing of the presentation of the video stream.

3. The method of claim 1, further comprising:
providing a firewall between the media device and the merchant.

4. The method of claim 1, further comprising:
receiving purchase information from the website based on the second user-generated input; and
accessing an account of a user from a service provider to complete a purchase via the website according to the purchase information.

5. The method of claim 1, wherein the inserting of the second portion of the product website information into the frame comprises:
identifying the second object related to the product website information within the frame as a related image; and
adding the product website information to the related image.

6. The method of claim 1, further comprising:
accessing a database comprising connections between objects and website links during the providing the video stream to the media device;
identifying an object from the database within the frame as an identified image; and
adding a related website link to the identified image.

7. The method of claim 6, wherein responsive to the receiving of the indication of the first user-generated input to pause the presentation of the video stream, the method further comprises:
performing an additional scan of the frame for additional objects of the database; and
adding additional related website links to the additional objects.

8. The method of claim 1, further comprising:
determining a location of the media device; and
providing location based website information related to the location of the media device as the product website information being inserted into the frame.

9. The method of claim 1, wherein the second user-generated input comprises a voice input.

10. A non-transitory machine-readable storage medium, comprising executable instructions that, when executed by a processing system including a processor, facilitate performance of operations, the operations comprising:
inserting a first link of a plurality of links in a frame of a plurality of frames of media content for a primary object of a plurality of objects that is detected as being displayed in the frame, wherein the primary object is sold by a merchant;
receiving a command during a displaying of the media content to pause the media content to display the frame;
responsive to the receiving of the command, inserting at least a second link of the plurality of links into the frame for at least a second object of the plurality of objects that is detected as being displayed in the frame, wherein the at least a second object is related to the primary object and is sold by the merchant;
receiving an input indicating a selection of the primary object or the at least a second object as a selected object in the frame; and
responsive to the selection of the primary object or the at least at second object, providing a connection to a website associated with the first link or the at least a second link in accordance with the selected object.

11. The non-transitory machine-readable storage medium of claim 10, wherein the receiving the input comprises a voice input.

12. The non-transitory machine-readable storage medium of claim 10, wherein the operations further comprise:
providing purchase information to the website based on user input, wherein the website accesses an account of a subscriber from a service provider of the media content to complete a purchase via the website according to the purchase information.

13. The non-transitory machine-readable storage medium of claim 10, wherein the operations further comprise:
performing a first search of the plurality of frames responsive to the receiving of the command to determine if the primary object in the frame matches an item category of a plurality of item categories; and
performing a second search of the frame, wherein the second search comprises accessing a portion of a database based on the item category of the first search.

14. An apparatus, comprising:
a processing system including a processor; and
a memory that stores executable instructions that, when executed by the processing system, facilitate performance of operations, the operations comprising:
providing media content to a media processor, wherein the media content comprises a plurality of frames;
providing a database to the media processor, wherein the database includes links for objects sold by a merchant that appear in the plurality of frames, wherein the media processor adds a first link of the links to a first object of the objects in a frame of the plurality of frames responsive to receiving a pause command, wherein the media processor adds a second link of the links to a second object of the objects in the frame while a presentation of the media content is paused, and wherein the database and the media content are both provided by a same service provider;
receiving an indication of a selection of the first object or the second object as a selected object in the frame from the media processor;
determining a webpage corresponding to the selected object; and
providing a connection to the webpage to the media processor via the same service provider, wherein access to the webpage is only active after the presentation of the media content is paused.

15. The apparatus of claim 14, wherein the media processor is configured to perform a preprocessing search of the media content while the media content is being displayed on a display of the media processor, and
wherein the media processor is configured to perform a search of the frame for selected objects that appear in the frame responsive to receiving the pause command.

16. The apparatus of claim 14, wherein the operations further comprise:
receiving purchase information from the webpage based on user input; and
accessing an account of a user to complete a purchase via the webpage according to the purchase information.

17. The apparatus of claim 16, wherein the providing the connection to the webpage comprises accessing a webserver of the webpage and providing the purchase information to the webserver.

18. The apparatus of claim 14, wherein the media processor determines a location of the media processor, and
wherein the media processor accesses the database according to the location to determine location appropriate links for the selected object in the frame.

19. The apparatus of claim 14, wherein the webpage is maintained by the same service provider.

20. The apparatus of claim 14, wherein operations further comprise:
providing a firewall between the media processor and a product provider that accesses the webpage.

\* \* \* \* \*